US012567174B2

(12) United States Patent
Harbour et al.

(10) Patent No.: US 12,567,174 B2
(45) Date of Patent: Mar. 3, 2026

(54) REAL-TIME POSE ESTIMATION THROUGH BIPARTITE MATCHING OF HEATMAPS OF JOINTS AND PERSONS AND DISPLAY OF VISUALIZATIONS BASED ON THE SAME

(71) Applicant: Hinge Health, Inc., San Francisco, CA (US)

(72) Inventors: Louis Harbour, Montreal (CA); Colin Joseph Brown, Saskatoon (CA); Caroline Rougier, Montreal (CA)

(73) Assignee: Hinge Health, Inc., San Francisco, CA (US)

( * ) Notice: Subject to any disclaimer, the term of this patent is extended or adjusted under 35 U.S.C. 154(b) by 81 days.

(21) Appl. No.: 18/478,378

(22) Filed: Sep. 29, 2023

(65) Prior Publication Data

US 2024/0112367 A1     Apr. 4, 2024

Related U.S. Application Data

(60) Provisional application No. 63/377,920, filed on Sep. 30, 2022.

(51) Int. Cl.
G06T 7/73 (2017.01)
G06T 7/246 (2017.01)
(Continued)

(52) U.S. Cl.
CPC ................ G06T 7/74 (2017.01); G06T 7/248 (2017.01); G06T 7/90 (2017.01); G06T 13/40 (2013.01);
(Continued)

(58) Field of Classification Search
CPC .. G06T 7/74; G06T 7/248; G06T 7/90; G06T 13/40; G06T 13/80; G06T 2207/10016;
(Continued)

(56) References Cited

U.S. PATENT DOCUMENTS

| 11,074,711 B1 * | 7/2021 | Akbas | .................... | G06V 40/20 |
| 12,299,949 B1 * | 5/2025 | Tang | ....................... | G06F 18/22 |

(Continued)

OTHER PUBLICATIONS

International Search Report and Written Opinion mailed on Jan. 12, 2024 for International Patent Application No. PCT/US23/75563; 13 pages.

*Primary Examiner* — Amr A Awad
(74) *Attorney, Agent, or Firm* — Perkins Coie LLP; Andrew T. Pettit

(57) ABSTRACT

Introduced here is an approach to allowing a computer-implemented model to learn its own ordering scheme by applying an appropriate loss function during training. More generally, the present disclosure pertains to computer programs and associated computer-implemented techniques for estimating pose of a living body through simultaneous analysis of multiple visualizations. For example, joint type heatmaps—where a given heatmap includes every visible joint of the corresponding type across all visible persons—can be combined with joint person heatmaps—where a given heatmap includes every visible joint of the corresponding person—to better understand the relationship between joints visible in a digital image and people included in the digital image.

15 Claims, 15 Drawing Sheets
(8 of 15 Drawing Sheet(s) Filed in Color)

(51) Int. Cl.
    G06T 7/90           (2017.01)
    G06T 13/40          (2011.01)
    G06T 13/80          (2011.01)

(52) U.S. Cl.
    CPC .... *G06T 13/80* (2013.01); *G06T 2207/10016*
        (2013.01); *G06T 2207/10024* (2013.01); *G06T*
            *2207/20081* (2013.01); *G06T 2207/20084*
            (2013.01); *G06T 2207/30196* (2013.01)

(58) Field of Classification Search
    CPC . G06T 2207/10024; G06T 2207/20081; G06T
                2207/20084; G06T 2207/30196; G06T
                                    7/246; G06T 11/206
    See application file for complete search history.

(56)                 References Cited

U.S. PATENT DOCUMENTS

| | | | |
|---|---|---|---|
| 2020/0043287 | A1 | 2/2020 | Zhang et al. |
| 2021/0209788 | A1* | 7/2021 | Kim .......................... G06T 7/73 |
| 2021/0225069 | A1 | 7/2021 | Meng et al. |
| 2021/0322856 | A1 | 10/2021 | Virkar et al. |
| 2021/0366146 | A1* | 11/2021 | Khamis ..................... G06T 7/73 |
| 2022/0079510 | A1 | 3/2022 | Robillard et al. |
| 2022/0277472 | A1 | 9/2022 | Birchfield et al. |
| 2023/0368415 | A1* | 11/2023 | Suzuki ..................... G06T 7/70 |
| 2024/0412452 | A1* | 12/2024 | Zheng ................... G06T 17/00 |

* cited by examiner

300

500

| Image Data 504 | Participant Data 506 | Program Data 508 | ... |

Motion Monitoring Platform
502

600

Motion Monitoring Platform
602

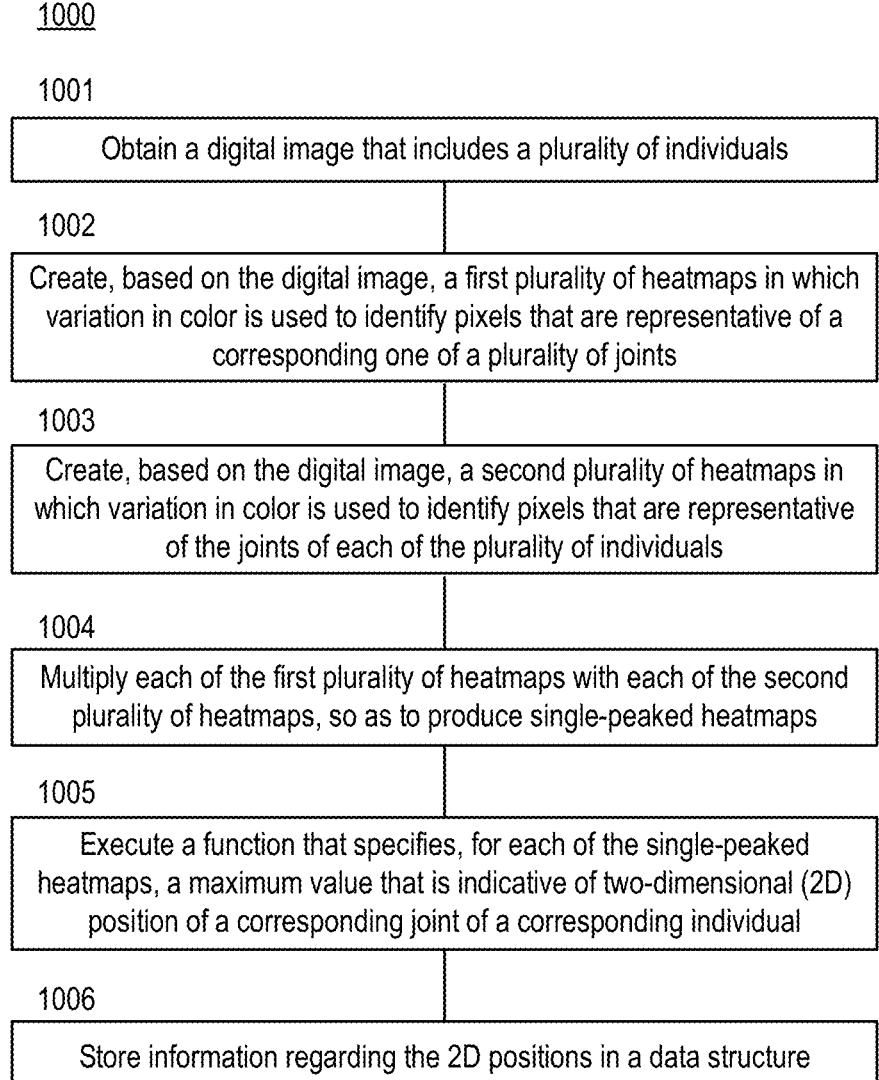

1000

1001

Obtain a digital image that includes a plurality of individuals

1002

Create, based on the digital image, a first plurality of heatmaps in which variation in color is used to identify pixels that are representative of a corresponding one of a plurality of joints

1003

Create, based on the digital image, a second plurality of heatmaps in which variation in color is used to identify pixels that are representative of the joints of each of the plurality of individuals

1004

Multiply each of the first plurality of heatmaps with each of the second plurality of heatmaps, so as to produce single-peaked heatmaps

1005

Execute a function that specifies, for each of the single-peaked heatmaps, a maximum value that is indicative of two-dimensional (2D) position of a corresponding joint of a corresponding individual

1006

Store information regarding the 2D positions in a data structure

FIGURE 10A

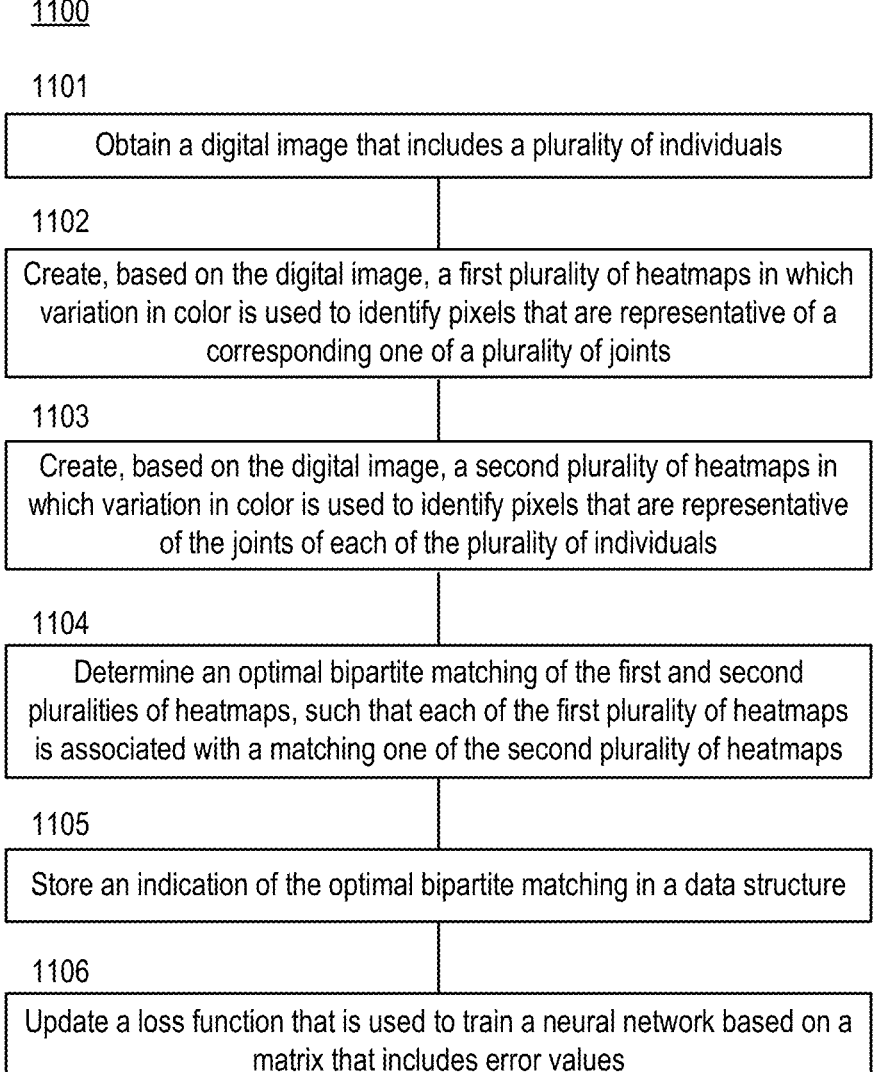

1100

1101

Obtain a digital image that includes a plurality of individuals

1102

Create, based on the digital image, a first plurality of heatmaps in which variation in color is used to identify pixels that are representative of a corresponding one of a plurality of joints

1103

Create, based on the digital image, a second plurality of heatmaps in which variation in color is used to identify pixels that are representative of the joints of each of the plurality of individuals

1104

Determine an optimal bipartite matching of the first and second pluralities of heatmaps, such that each of the first plurality of heatmaps is associated with a matching one of the second plurality of heatmaps

1105

Store an indication of the optimal bipartite matching in a data structure

1106

Update a loss function that is used to train a neural network based on a matrix that includes error values

REAL-TIME POSE ESTIMATION THROUGH BIPARTITE MATCHING OF HEATMAPS OF JOINTS AND PERSONS AND DISPLAY OF VISUALIZATIONS BASED ON THE SAME

CROSS-REFERENCE TO RELATED APPLICATIONS

This application claims priority to U.S. Provisional Application No. 63/377,920, titled "Two-Dimensional Pose Estimation Based On Joint Type Heatmaps And Joint Person Heatmaps" and filed on Sep. 30, 2022, which is incorporated herein by reference in its entirety.

TECHNICAL FIELD

Various embodiments concern computer programs and associated computer-implemented techniques for estimating pose of a living body through simultaneous analysis of multiple visualizations.

BACKGROUND

Pose estimation (also called "pose detection") is an active area of study in the field of computer vision. Over the last several years, tens—if not hundreds—of different approaches have been proposed in an effort to solve the problem of pose detection. Many of these approaches rely on machine learning due to its programmatic approach to learning what constitutes a pose.

As a field of artificial intelligence, computer vision enables machines to perform image processing tasks with the aim of imitating human vision. Pose estimation is an example of a computer vision task that generally includes detecting, associating, and tracking the movements of a person. This is commonly done by identifying "keypoints" that are semantically important to understanding pose. Examples of keypoints include "head," "left shoulder," "right shoulder," "left knee," and "right knee." Insights into posture and movement can be drawn from analysis of these keypoints.

Detection systems (also called "detection libraries") for pose estimation have traditionally employed either a "bottom-up approach" or a "top-down approach." With a bottom-up approach, a detection system initially estimates the location of keypoints of a person and then groups those locations together to define a pose. With a top-down approach, a detection system initially runs a detecting algorithm (also called a "detector") that identifies the person and outputs a bounding box and then estimates the locations of keypoints within the bounding box. Today, several detection systems are commonly used to perform pose estimation. These detection systems include Open Pose, Pose Net, Blaze Pose, and Deep Pose.

Choosing one detection system over another detection system may depend on various factors, such as intended application, running time, size, and ease of implementation. Regardless of the detection system chosen, performance tends to require high amounts of computation resources, especially if the detection system is to be applied in real time (e.g., to the frames of a video feed). The high computational "costs" have limited the development and adoption of detection systems in the context of pose estimation.

BRIEF DESCRIPTION OF THE DRAWINGS

This patent or application contains at least one drawing executed in color. Copies of this patent or application publication with color drawings will be provided by the Office upon request and payment of the necessary fee.

FIG. 10A includes a flow diagram of a process for determining optimal bipartite matching of heatmaps produced by a model for the purpose of establishing the position of joints of individuals.

FIG. 11 includes a flow diagram of a process for determining optimal bipartite matching of heatmaps produced by a model for the purpose of training a neural network to predict the position of joints of individuals.

Figure 1:
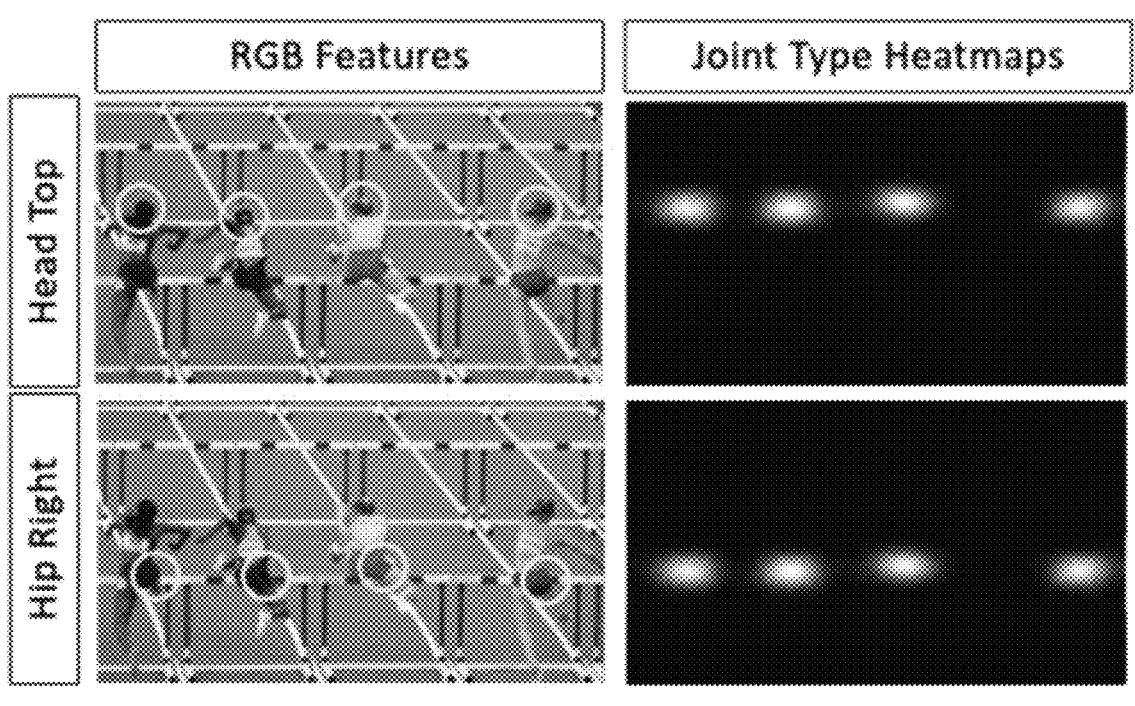
FIG. 1 includes an example of heatmaps that may be generated by a traditional pose estimator for two joint types, namely, the head and right hip.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, although specific embodiments are shown in the drawings, the technology is amenable to various modifications.

DETAILED DESCRIPTION

Pose estimation can be done in either two dimensions or three dimensions. Two-dimensional ("2D") pose estimation predicts the 2D spatial location of the keypoints, generally through analysis of the pixels of a digital image. Three-dimensional ("3D") pose estimation predicts the 3D spatial arrangement of the keypoints, generally through analysis of the pixels of multiple digital images or analysis of the pixels of a digital image in combination with another type of data generated by, for example, an inertial measurement unit ("IMU") or Light Detection and Ranging ("LIDAR") unit.

Traditional 2D pose estimation programs (also called "2D pose estimators" or simply "pose estimators") commonly follow the "bottom-up approach" mentioned above. Specifically, a traditional pose estimator may predict, for one or more joint types, heatmaps for the individuals included in a given digital image. These heatmaps may have dimensions of H×W×J, where J represents the number of joint types. At a high level, these heatmaps are representative of arrays of values, possibly represented as a number of image channels. Generally, these values are within a range (e.g., from a minimum value, such as 0, to a maximum value, such as 1, 10, 100, etc.), such that a variable of interest can be visually illustrated across an array of squares corresponding to the array of values. FIG. 1 includes an example of heatmaps that may be generated by a traditional pose estimator for two joint types, namely, the head and right hip. As can be seen in FIG. 1, the body parts related to each joint types share similar features from the Red-Green-Blue ("RGB") channel of the digital image and are classified without ambiguity in the appropriate channel.

Figure 2:
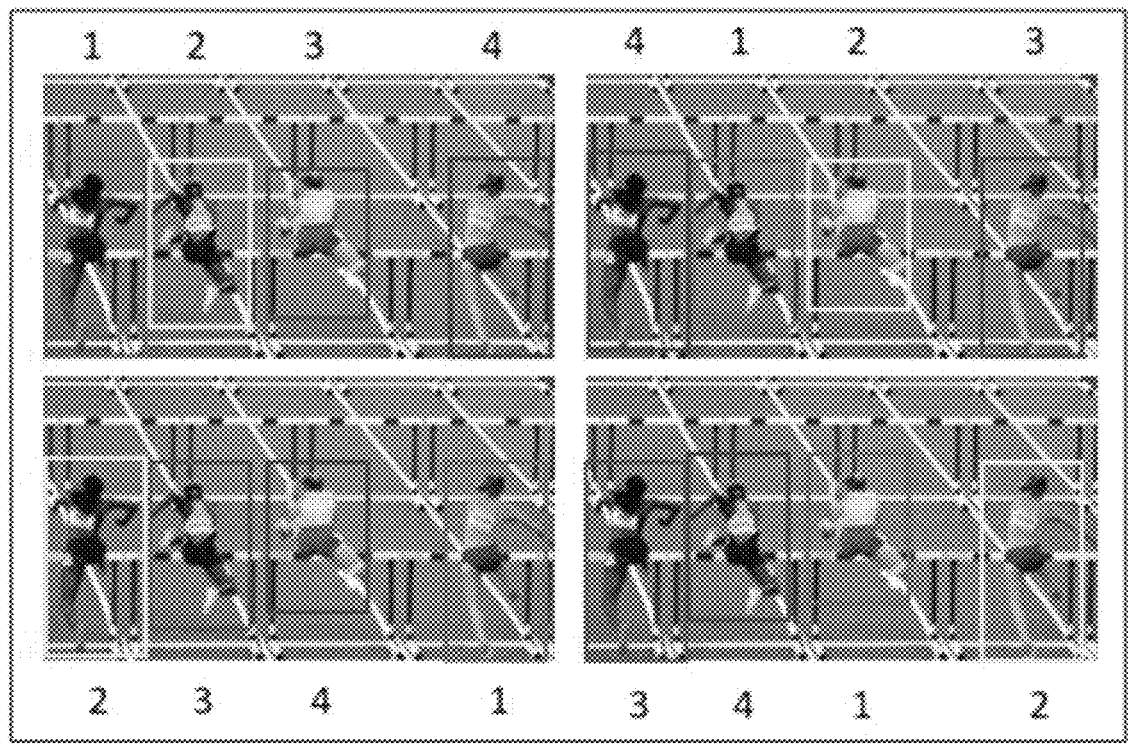
FIG. 2 includes several examples of valid identifier ordering when classifying four targets included in a single digital image.

For a given joint type, there is at least one feature—generally, a collection of pixels that is indicative of a keypoint—that the traditional pose estimator will learn to find wherever it is positioned inside the digital image. There is generally little to no ambiguity for the traditional pose estimator to classify all distinct features of the given joint type found at different positions in the digital image into the appropriate channel type. However, if one were interested in classifying each peak of a given joint type into a new channel that represents a single person, there is no clear feature to indicate which channel index is associated with which person. Said another way, there is no way to programmatically associate each channel index with a corresponding person, such that the instances of the given joint type can be kept separate on a per-person basis. The way that one would classify N people detected within a digital image into N channels might be entirely different while still being a good choice. FIG. 2 includes several examples of valid identifier ordering when classifying four targets included in a single digital image. The ambiguity in channel ordering may make it challenging for a machine learning model (or simply "model") to learn by direct supervision. Efforts have been made to address issues related to ordering ambiguity by designing hand-crafted rules to detect order in a similar fashion across all digital images. However, these rules are not only burdensome to develop but also burdensome to implement. For example, even a relatively straightforward rule—like number people from left to right along the x-axis—can be difficult to apply if people are not aligned as envisioned (e.g., are aligned along the y-axis), if digital images from different perspectives are being analyzed, etc.

Introduced here is an approach to allowing a model to learn its own ordering scheme by applying an appropriate loss function during training. More generally, the present disclosure pertains to computer programs and associated computer-implemented techniques for estimating pose of a living body through simultaneous analysis of multiple visualizations. For example, joint type heatmaps (also called "joint heatmaps" or "type heatmaps")—where a given heatmap includes every visible joint of the corresponding type across all visible persons—can be combined with joint person heatmaps (also called "person heatmaps")—where a given heatmap includes every visible joint of the corresponding person—to better understand the relationship between joints visible in a digital image and people included in the digital image.

Directly supervising the joint person heatmaps with a predefined ordering of the people can lead to unstable training, and therefore poor predicting outcomes (also called "inferencing outcomes") thereafter. Using a bipartite matching algorithm in the model training loss function can solve the predefined ordering problem by letting the underlying model define which channel represents which person and only penalizing matched maps. Combining these different kinds of heatmaps enables the output of, for each person included in a digital image, a joint heatmap of each type with a single peak. Such an approach obviates the need for computationally intensive local maximum algorithms (e.g., FindPeaks) and decoding of bone maps (e.g., with clustering). Instead, the spatial coordinates of each joint can be directly obtained by identifying the maximum values of each heatmap. As an example, in the event that each heatmap is in x- and y-coordinate space, the spatial coordinate of each joint can be identifying by taking $(argmax_x, argmax_y, max)$ of each heatmap.

In the present disclosure, the aforementioned approach is generally described in the context of a motion monitoring platform that is embodied as a computer program executing on a computing device that is accessible to a participant. As further discussed below, the motion monitoring platform may represent one part of a physical activity computing system (or simply "computing system" or "system") that is designed to promote compliance with an exercise therapy program by estimating the poses of participants via computer vision techniques as those participants perform physical activities. Though embodiments may be described in relation to physical activities (e.g., exercises)—the performance of which is intended to have a therapeutic effect—the motion monitoring platform may be used to monitor performances of physical activities for purposes beyond healthcare, such as for wellness, sports, dance, virtual reality, augmented reality, cooking, art, or any other endeavor that requires physical activities be performed in a particular manner (or simply benefits from physical activities being performed in a particular manner). More detailed examples of how monitoring pose can be helpful in different contexts are provided below.

The computing device on which the motion monitoring platform resides may include one or more image sensors that capture data about the environment surrounding the participant. As the participant completes physical activities, image data generated by the image sensors can be provided to the motion monitoring platform for analysis. By analyzing the image data, the motion monitoring platform may be able to establish whether the participant is properly completing the physical activities (e.g., by identifying locations of different body parts and inferring poses based on the locations). Note, however, that in some embodiments, the image sensors are separate from the computing device on which the motion monitoring platform is executing. For example, the motion monitoring platform may reside on a server system that is accessible via the Internet, while the image sensors may be included in a mobile phone or tablet computer. Alternatively, the image sensors may be included in standalone camera modules that are arranged through an environment, for example, for the purpose of motion capture.

For the purpose of illustration, embodiments may be described with reference to anatomical landmarks, pose estimation applications, data processing "flows," and the like. However, those skilled in the art will recognize that the features are similarly applicable to other anatomical landmarks, pose estimation applications, and data processing "flows." As an example, embodiments may be described in the context of a motion monitoring platform that is designed to facilitate the completion of exercise therapy sessions (or simply "sessions") as part of an exercise therapy program (or simply "program"). However, the motion monitoring platform could be designed to prompt, facilitate, or guide the performance of other physical activities.

Moreover, embodiments may be described in the context of computer-executable instructions for the purpose of illustration. However, aspects of the technology could be implemented via hardware or firmware in addition to, or instead of, software. As an example, a motion monitoring platform may be embodied as a computer program that in addition to offering support for completing sessions as part of a program, can also enable communication between participants and coaches and determine which physical activities are appropriate for a session given past performance, specified preferences, etc. The term "coach" may be used to generally refer to individuals who prompt, encourage, or otherwise facilitate engagement by participants with the motion monitoring platform. Note that the term "participant" may be used interchangeably with "user," even if that individual has limited or no ability to engage with the motion monitoring platform. Moreover, the motion monitoring platform may be designed to monitor performances of exercises for addressing a musculoskeletal ("MSK") conditions as discussed above, and therefore the terms "patients" and "subjects" could also be used interchangeably with the term "participants."

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense. That is, in the sense of "including but not limited to." The term "based on" is also to be construed in an inclusive sense. Thus, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, elements may be electrically or communicatively coupled to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing all tasks.

When used in reference to a list of multiple items, the word "or" is intended to cover all of the following interpretations: any of the items in the list, all of the items in the list, and any combination of items in the list.

Overview of Motion Monitoring Platform

A motion monitoring platform may be responsible for monitoring the motion of one or more individuals through analysis of digital images that contain those individuals. As an example, the motion monitoring platform may guide an individual through sessions that are performed as part of a program. As part of a program, the individual may be requested to engage with the motion monitoring platform on a periodic basis, and the motion monitoring platform may be responsible for monitoring the pose of the individual through analysis of digital images that contain her and are captured as she completes exercises. The frequency with which the individual is requested to engage with the motion monitoring platform may be based on factors such as the anatomical region for which therapy is needed, the MSK condition for which therapy is needed (or non-healthcare related condition, such as desire to improve technique, for which instruction or practice is needed), the difficulty of the program, the age of the individual, the amount of progress that has been achieved, and the like.

As mentioned above, the motion monitoring platform could alternatively estimate pose in contexts that are unrelated to healthcare, for example, to improve technique. For example, an image sensor that is embedded in a computing device (e.g., a mobile phone or tablet computer) may be used for capturing image data of an individual playing a virtual reality game, or an image sensor may be affixed to the top of a television for capturing image data of an individual playing a virtual reality game. The motion monitoring platform may be able to infer whether the individual dodged monsters in the virtual reality game based on the image data captured by the image sensor. In another example, two image sensors may be placed in a kitchen, one above the island and the other above the stove. The motion monitoring platform may use image data of an individual's hands captured by either image sensor to determine if the individual is using proper technique when chopping and sauteing zucchini. The motion monitoring platform may employ any number of computer vision techniques for determining body poses in these scenarios. Examples of computer vision techniques include image classification, object detection, object tracking, semantic segmentation, and instance segmentation. Accordingly, the motion monitoring platform may estimate pose of an individual participant while she completes an athletic activity (e.g., dancing, shooting a basketball, throwing a baseball), a virtual reality activity, an augmented reality activity, a cooking activity, an art activity, etc.

Figure 3:
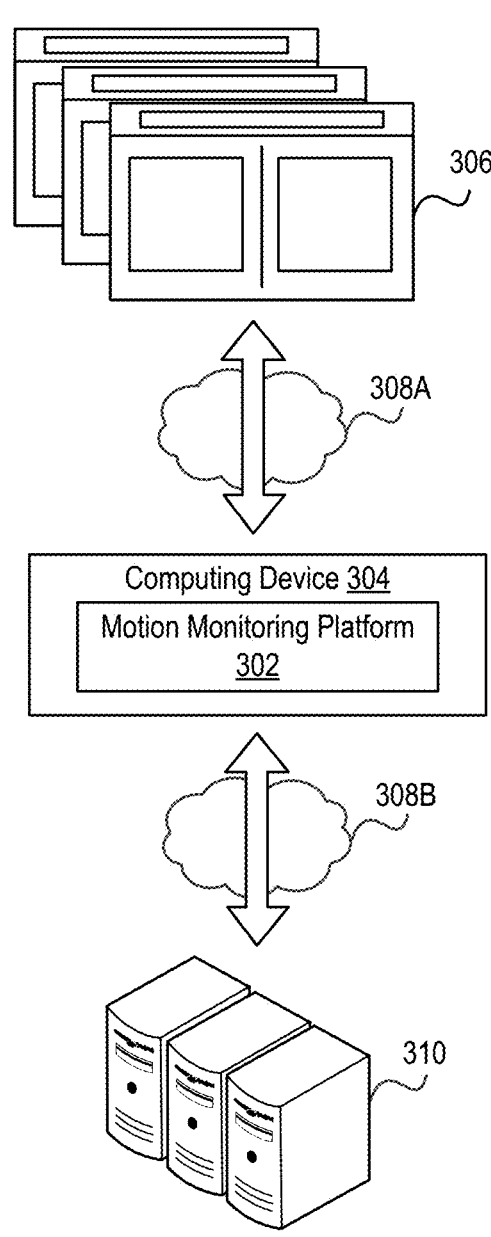
FIG. 3 illustrates a network environment that includes a motion monitoring platform that is executed by a computing device.

FIG. 3 illustrates a network environment 300 that includes a motion monitoring platform 302 that is executed by a computing device 304. Different types of users can interact with the motion monitoring platform 302 via interfaces 306. For example, participants may be able to access interfaces that are designed to guide performances of physical activities, present educational content, indicate progress, present feedback, etc. As another example, coaches may be able to access interfaces through which information regarding completed physical activities can be reviewed, feedback can be provided, etc. Thus, interfaces 306 generated by the motion monitoring platform 302 may serve as informative spaces for participants or coaches, or the interfaces 306 generated by the motion monitoring platform 302 may serve as collaborative spaces through which participants and coaches can communicate with one another.

As shown in FIG. 3, the motion monitoring platform 302 may reside in a network environment 300. Thus, the computing device on which the motion monitoring platform 302 is executing may be connected to one or more networks 306A-B. Depending on its nature, the computing device 304 could be connected to a personal area network ("PAN"), local area network ("LAN"), wide area network ("WAN"), metropolitan area network ("MAN"), or cellular network. For example, if the computing device 304 is a mobile phone, then the computing device 304 may be connected to (i) one or more sensor units via a short-range wireless connectivity technology and (ii) a computer server via the Internet. As another example, if the computing device 304 is a computer server, then the computing device 304 may be accessible to users via respective computing devices that are connected to the Internet via LANs.

The interfaces 306 may be accessible via a web browser, desktop application, mobile application, or another form of computer program. For example, to interact with the motion monitoring platform 302, a coach may initiate a web browser on the computing device 304 and then navigate to a web address associated with the motion monitoring platform 302. Through the web browser, the coach may be able to review the progress of participants, communicate with participants, or personalize participants' sessions (e.g., based on their needs and past progress). As another example, a participant may access, via a desktop application or mobile application, interfaces that are generated by the motion monitoring platform 302 through which she can select physical activities to complete, review analyses of her performance of the physical activities, and the like. Accordingly, interfaces generated by the motion monitoring platform 302 may be accessible via various computing devices, including mobile phones, tablet computers, desktop computers, wearable electronic devices (e.g., watches or fitness accessories), mobile workstations (also called "computer carts"), virtual reality systems, augmented reality systems, and the like.

Generally, the motion monitoring platform 302 is hosted, at least partially, on the computing device 304 that is responsible for generating the digital images to be analyzed, as further discussed below. For example, the motion monitoring platform 302 may be embodied as a mobile application executing on a mobile phone or tablet computer. In such embodiments, the instructions that, when executed, implement the motion monitoring platform 302 may reside largely or entirely on the mobile phone or tablet computer. Note, however, that the mobile application may be able to access a server system 310 on which other aspects of the motion monitoring platform 302 are hosted.

In some embodiments, aspects of the motion monitoring platform 302 are executed by a cloud computing service operated by, for example, Amazon Web Services®, Google Cloud Platform™, or Microsoft Azure®. Accordingly, the computing device 304 may be representative of a computer server that is part of a server system 310. Often, the server system 310 is comprised of multiple computer servers that are accessible via a network (e.g., the Internet). These computer servers can include information regarding different programs, sessions, or physical activities; computer-implemented templates (or simply "templates") that indicate how anatomical landmarks should move when a given physical activity is performed; algorithms for processing image data from which spatial position or orientation of anatomical landmarks can be computed, inferred, or otherwise determined; participant data such as name, age, weight, ailment, enrolled program, duration of enrollment, number of sessions completed, and number of physical activities completed; and other assets.

Those skilled in the art will recognize that this information could also be distributed amongst the server system 310 and one or more computing devices. For example, some participant data may be stored on, and processed by, her own computing device for security and privacy purposes. This participant data may be processed (e.g., encrypted or obfuscated) before being transmitted to the server system 310. As another example, some participant data may be retrieved from an electronic health record (also called an "electronic medical record") that is maintained for the participant. Electronic health records are normally maintained in storage that is managed by, or at least accessible to, healthcare systems, and this storage may be accessible to the motion monitoring platform 302 (e.g., via an application programming interface). As another example, the heuristics, algorithms, and models needed to process image data to establish the spatial position or orientation of anatomical landmarks of a given participant can be computed, inferred, or otherwise determined may be stored on, or accessible to, a computing device associated with the given participant to ensure that such image data can be processed in real time (e.g., as physical activities are performed as part of a session). In some embodiments, the pose monitoring platform 302 is able to establish the spatial position or orientation of anatomical landmarks through analysis of data that is generated by one or more sensor units that are secured to the participant (e.g., proximate to the anatomical landmarks). This sensor data could be analyzed in addition to, or instead of, image data that is representative of one or more images of the participant.

Figure 4:
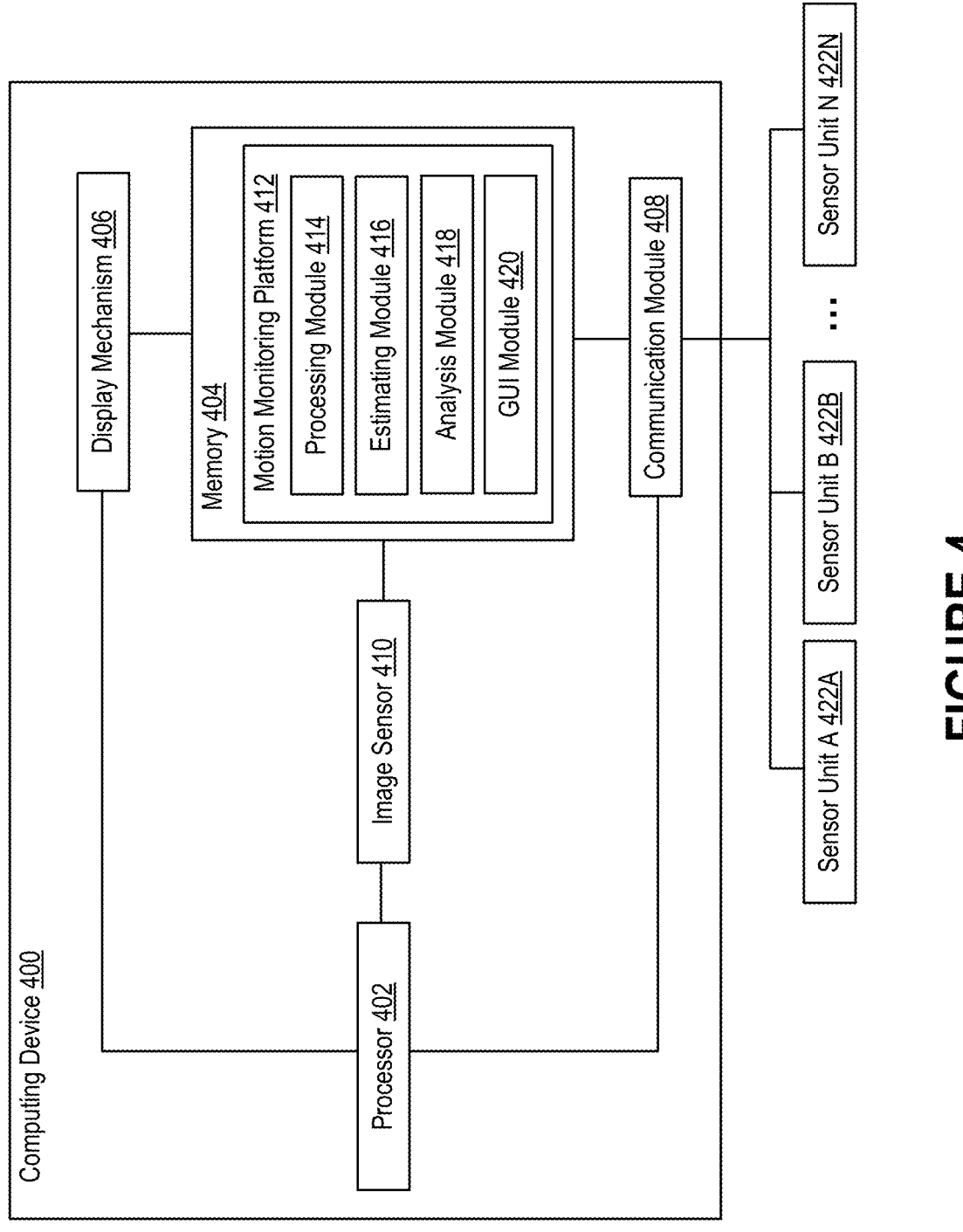
FIG. 4 illustrates an example of a computing device that is able to implement a program in which a participant is requested to perform physical activities, such as exercises, during sessions and those performances are analyzed by a motion monitoring platform.

FIG. 4 illustrates an example of a computing device 400 that is able to implement a program in which a participant is requested to perform physical activities, such as exercises, during sessions and those performances are analyzed by a motion monitoring platform 412. In some embodiments, the motion monitoring platform 412 is embodied as a computer program that resides in memory 404 and is executed by a processor 402 as shown in FIG. 4. In other embodiments, the motion monitoring platform 412 is embodied as a computer program that is executed by another computing device (e.g., a computer server that is part of server system 310 of FIG. 3) to which the computing device 400 is communicatively connected. In such embodiments, the computing device 400 may transmit image data generated by the image sensor 410 to the other computing device for processing. Those skilled in the art will recognize that aspects of the computer program could also be distributed amongst multiple computing devices.

As shown in FIG. 4, the computing device 400 can include a processor 402, memory 404, display mechanism 408, communication module 408, and image sensor 410. Each of these components is discussed in greater detail below.

Those skilled in the art will recognize that different combinations of these components may be present depending on the nature of the computing device 400. For example, if the computing device 400 is a computer server that is part of a server system (e.g., server system 310 of FIG. 3), then the computing device 400 may not include the display mechanism 406 or image sensor 410, though the computing device 400 may be communicatively connectable to another computing device that does include a display mechanism and/or an image sensor.

The processor 402 can have generic characteristics similar to general-purpose processors, or the processor 402 may be an application-specific integrated circuit ("ASIC") that provides control functions to the computing device 400. As shown in FIG. 4, the processor 402 can be coupled to all components of the computing device 400, either directly or indirectly, for communication purposes.

The memory 404 may be comprised of any suitable type of storage medium, such as static random-access memory ("SRAM"), dynamic random-access memory ("DRAM"), electrically erasable programmable read-only memory ("EEPROM"), flash memory, or registers. In addition to storing instructions that can be executed by the processor 402, the memory 404 can also store data generated by the processor 402 (e.g., when executing the modules of the motion monitoring platform 412) and produced, retrieved, or obtained by the other components of the computing device 400. For example, image data generated by the image sensor 410 may be stored in the memory 404, or sensor data received by the communication module 408 from the sensor units 422A-N may be stored in the memory 404. As mentioned above, image data could also be obtained from a source external to the computing device 400—like an external camera peripheral, such as a video camera or webcam—in which case the image data may be received by the communication module 408 and stored in the memory 404. Note that the memory 404 is merely an abstract representation of a storage environment. The memory 404 could be comprised of actual integrated circuits (also referred to as "chips").

The display mechanism 406 can be any mechanism that is operable to visually convey information to a user. For example, the display mechanism 406 may be a panel that includes light-emitting diodes ("LEDs"), organic LEDs, liquid crystal elements, or electrophoretic elements. In some embodiments, the display mechanism 406 is touch sensitive. Thus, a user may be able to provide input to the motion monitoring platform 412 by interacting with the display mechanism 406. Alternatively, the user may be able to provide input to the motion monitoring platform 412 through some other control mechanism.

The communication module 408 may be responsible for managing communications external to the computing device 400. For example, the communication module 408 may be responsible for managing communications with other computing devices (e.g., sensor units 420A-N of FIG. 4, server system 310 of FIG. 3, or a camera peripheral). The communication module 408 may be wireless communication circuitry that is designed to establish communication channels with other computing devices. Examples of wireless communication circuitry include 2.4 gigahertz ("GHz") and 5 GHz chipsets compatible with Institute of Electrical and Electronics Engineers ("IEEE") 802.11—also referred to as "Wi-Fi chipsets." Alternatively, the communication module 208 may be representative of a chipset configured for Bluetooth®, Near Field Communication ("NFC"), and the like. Some computing devices—like mobile phones and tablet computers—are able to wirelessly communicate via separate channels. Accordingly, the communication module

208 may be one of multiple communication modules implemented in the computing device 200. As an example, the communication module 408 may initiate and then maintain one communication channel with a camera peripheral (e.g., via Bluetooth) or sensor units 422A-N, and the communication module 408 may initiate and then maintain another communication channel with a server system (e.g., via the Internet).

The nature, number, and type of communication channels established by the computing device 400—and more specifically, the communication module 408—may depend on the sources from which data is received by the motion monitoring platform 412 and the destinations to which data is transmitted by the motion monitoring platform 412. Assume, for example, that the computing device 400 is representative of a mobile phone that is associated with (e.g., owned by) a participant. In some embodiments the communication module 408 may only externally communicate with a computer server, while in other embodiments the communication module 408 may also externally communicate with a source from which to receive image data. The source could be another computing device (e.g., a mobile phone or camera peripheral that includes an image sensor) to which the mobile device is communicatively connected. Image data could be received from the source even if the mobile phone generates its own image data. Thus, image data could be acquired from multiple sources, and these image data may correspond to different perspectives of the participant performing a physical activity. Regardless of the number of sources, image data—or analyses of the image data—may be transmitted to the computer server for storage in a digital profile that is associated with the participant. The same may be true if the motion monitoring platform 412 only acquires image data generated by the image sensor 410. The image data may initially be analyzed by the motion monitoring platform 412, and then the image data—or analyses of the image data—may be transmitted to the computer server for storage in the digital profile.

The image sensor 410 may be any electronic sensor that is able to detect and convey information in order to generate images, generally in the form of image data (also called "pixel data"). Examples of image sensors include charge-coupled device ("CCD") sensors and complementary metal-oxide semiconductor ("CMOS") sensors. The image sensor 410 may be part of a camera module (or simply "camera") that is implemented in the computing device 400. In some embodiments, the image sensor 410 is one of multiple image sensors implemented in the computing device 400. For example, the image sensor 410 could be included in a front- or rear-facing camera on a mobile phone. In some embodiments, the image sensor 410 may be externally connected to the computing device 400 such that the image sensor 410 generates image data that is representative of a stream of digital images of an environment and sends the image data to the motion monitoring platform 412.

For convenience, the motion monitoring platform 412 may be referred to as a computer program that resides in the memory 404. However, the motion monitoring platform 412 could be comprised of hardware or firmware in addition to, or instead of, software. In accordance with embodiments described herein, the motion monitoring platform 412 may include a processing module 414, pose estimating module 416, analysis module 418, and graphical user interface ("GUI") module 420. These modules can be an integral part of the motion monitoring platform 412. Alternatively, these modules can be logically separate from the motion monitoring platform 412 but operate "alongside" it. Together, these modules may enable the motion monitoring platform 412 to programmatically monitor motion of participants during performances of physical activities. This could be done in an effort to improve performance of the physical activities or accomplish some other objective, such as manage or treat an MSK condition that is affecting a particular anatomical region.

The processing module 414 can process image data obtained from the image sensor 410 over the course of a session. The image data may be used to infer a spatial position or orientation of one or more anatomical landmarks, and insights into performance of the physical activity can be gained through analysis of the inferred spatial position or orientation. For example, the processing module 414 may perform operations (e.g., filtering noise, changing contrast, reducing size) to ensure that the data can be handled by the other modules of the motion monitoring platform 412. As another example, the processing module 414 may temporally align the data with data obtained from another source (e.g., the sensor units 422A-N or another image sensor) if multiple data are to be used to establish the spatial position or orientation of the anatomical landmarks of interest. Examples of anatomical landmarks include joints (e.g., elbows, shoulders, knees), body parts (e.g., left hand, right hand, left shin, right foot, etc.), and body regions (e.g., abdominal region, cranial region, facial region).

As mentioned above, the processing module 414 may additionally or alternatively process sensor data obtained from sensor units 422A-N attached to the participant proximate to anatomical landmarks of interest, over the course of the session. The processing module 414 can parse, filter or otherwise alter this data so that it is usable by the other modules of the motion monitoring platform 412. As an example, in some embodiments, the processing module 414 may examine this sensor data in order to ensure that multiple streams of data received from different components (e.g., Sensor Unit A 422A and Sensor Unit B 422B) are temporally aligned with one another.

Moreover, the processing module 414 may be responsible for processing information input by users through interfaces generated by the GUI module 420. For example, the GUI module 420 may be configured to generate a series of interfaces that are presented in succession to a participant as she completes physical activities as part of a session. On some or all of these interfaces, the participant may be prompted to provide input. For example, the participant may be requested to indicate (e.g., via a verbal command or tactile command provided via, for example, the display mechanism 406) that she is ready to proceed with the next physical activity, that she completed the last physical activity, that she would like to temporarily pause the session, etc. These inputs can be examined by the processing module 414 before information indicative of these inputs is forwarded to another module.

The pose estimating module 416 (or simply "estimating module") may be responsible for estimating the pose of the participant through simultaneous analysis of multiple visualizations, in accordance with the approach further discussed below. Specifically, the estimating module 416 can create, based on a digital image (e.g., generated by the image sensor 410), different types of heatmaps and then determine appropriate matching between clusters of pixels in the different types of heatmaps. For example, the estimating module 416 can apply a model to the digital image, so as to produce (i) joint type heatmaps that identify every visible joint of a corresponding type and (ii) joint person heatmaps that identify every visible joint of a corresponding person. The model could be a neural network that when applied to the digital image, analyzes the pixels to independently identify (i) digital features that are representative of each joint type and (ii) digital features that are representative of the joints of each individual.

The analysis module 418 may be responsible for combining the joint type heatmaps with the joint person heatmaps to better understand the relationships between joints visible in the digital image and people included in the digital image. For example, the analysis module 418 may determine the optimal bipartite matching of the joint type heatmaps and joint person heatmaps by (i) providing these heatmaps to an algorithm that produces a matrix as output and (ii) establishing a matching scheme based on an analysis of the matrix. For each of the joint type heatmaps, the matrix may include values indicative of error calculated for each of the joint person heatmaps. Accordingly, the analysis module 418 may identify, for each of the joint type heatmaps, a corresponding one of the joint person heatmaps that has a lowest error as the closest match. For example, the analysis module 418 may apply an algorithm to the matrix to identify an appropriate pairings of joint type heatmaps and joint person heatmaps.

Other modules could also be included in some embodiments. For example, the motion monitoring platform 412 may include a training module (not shown) that is responsible for training the model that is employed by the pose estimating module 416. As mentioned above, the analysis module 418 may generate a matrix that specifies for each of the joint type heatmaps, the error calculated for each of the joint person heatmaps. Based on these errors, appropriate pairings of joint type heatmaps and joint person heatmaps can be established by the analysis module 418. The training module may update a loss function that is used to train the model with the errors computed for the appropriate pairings. Alternatively, upon receiving the matrix from the analysis module 418, the training model may identify, for each of the joint type heatmaps, a corresponding one of the joint person heatmaps that has the highest error and then penalizing the identified heatmaps of the joint person heatmaps during training of the model.

Figure 5:
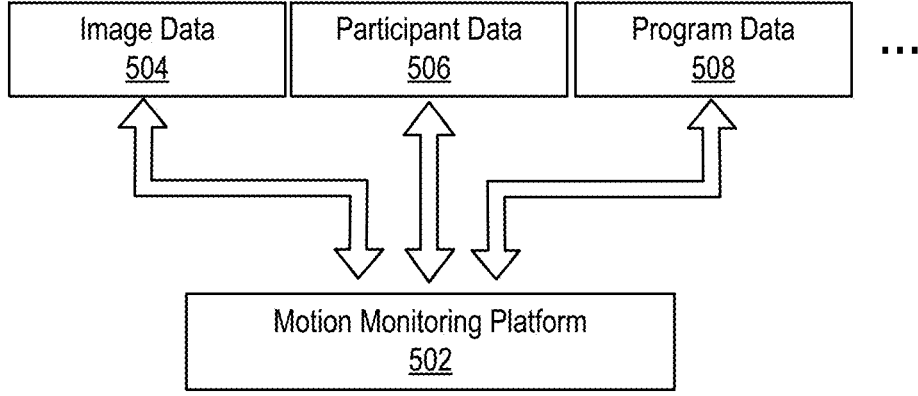
FIG. 5 depicts an example of a communication environment that includes a motion monitoring platform that is configured to receive several types of data.

FIG. 5 depicts an example of a communication environment 500 that includes a motion monitoring platform 502 that is configured to receive several types of data. Here, for example, the motion monitoring platform 502 receives image data 504 that captured by a first image sensor (e.g., image sensor 410 of FIG. 4), participant data 506 (also called "patient data" or "user data") that is representative of information regarding the participant, and program data 508 (also called "regimen data") that is representative of information regarding the program in which the participant is enrolled. Those skilled in the art will recognize that these types of data have been selected for the purpose of illustration. Other types of data, such as community data (e.g., information regarding characteristics and adherence of cohorts of participant), could also be obtained by the motion monitoring platform 502.

These data may be obtained from multiple sources. For example, the program data 508 may be obtained from a network-accessible server system managed by a digital service that is responsible for enrolling and then engaging participants in programs. The digital service may be responsible for defining the series of physical activities to be performed during sessions based on input provided by coaches. As another example, the participant data 506 may be obtained from various computing devices. For instance, some participant data 506 may be obtained directly from participants (e.g., who input such data during a registration procedure or during a session), while other participant data 506 may be obtained from employers (e.g., who are promoting or facilitating a wellness program) or healthcare facilities such as hospitals and clinics. Additionally or alternatively, participant data 506 could be obtained from another computer program that is executing on, or accessible to, the computing device on which the motion monitoring platform 502 resides. For example, the motion monitoring platform 502 may retrieve participant data 506 from a computer program that is associated with a healthcare system through which the participant receives treatment. As another example, the motion monitoring platform 502 may retrieve participant data 506 from a computer program that establishes, tracks, or monitors the health of the participant (e.g., by measuring steps taken, calories consumed, heart rate, blood pressure, blood glucose level, etc.).

Figure 6:
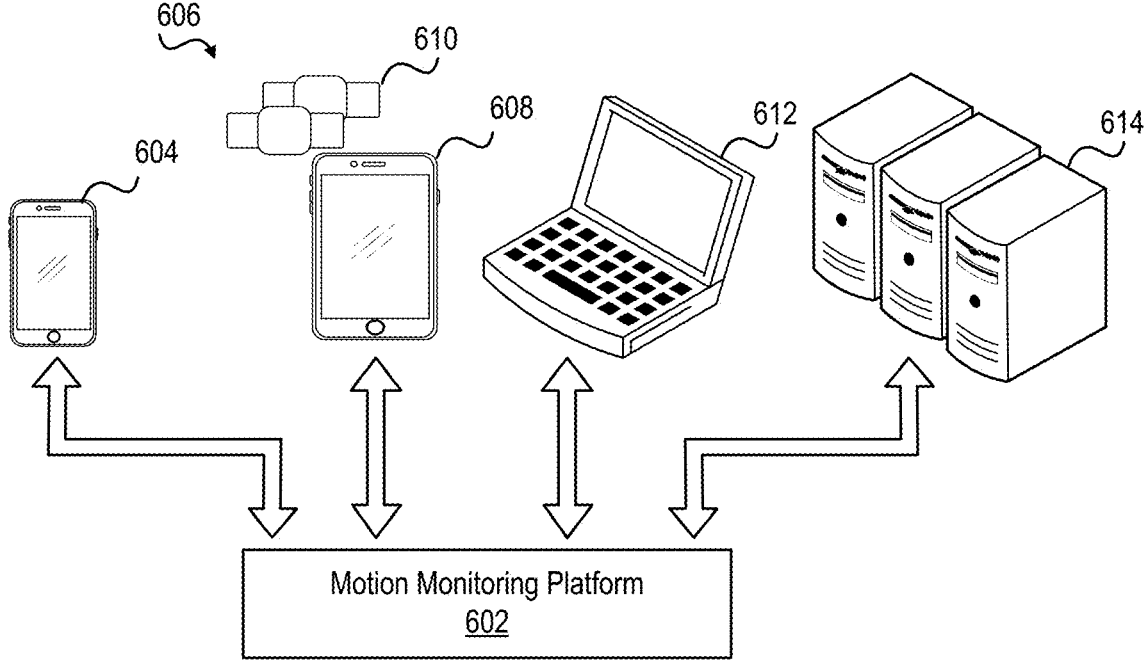
FIG. 6 depicts another example of a communication environment that includes a motion monitoring platform that is configured to obtain data from one or more sources.

FIG. 6 depicts another example of a communication environment 600 that includes a motion monitoring platform 602 that is communicatively connectable to, and therefore able to obtain data from, different sources. For example, the motion monitoring platform 602 may be able to obtain data from a mobile phone 604, a therapy system 606 comprised of a tablet computer 608 and one or more sensor units 610, a personal computer 612, or a network-accessible server system 614 (collectively referred to as the "networked devices"). For example, the motion monitoring platform 602 may obtain image data—from which movement of a participant while performing a physical activity is determinable—from the mobile phone 354. As another example, the motion monitoring platform 602 may obtain sensor data—from which movement of a participant while performing a physical activity is determinable—from the therapy system 606. The sensor data may be representative of a series of measurements that are indicative of velocity, acceleration, or orientation and are arranged in temporal order. Other data (e.g., therapy regimen information, models of exercise-induced movements, feedback from coaches, and processing operations) could be obtained from the personal computer 612 or network-accessible server system 614.

The networked devices can be connected to the motion monitoring platform 602 via one or more networks. These networks can include PANs, LANs, WANs, MANs, cellular networks, the Internet, etc. Additionally or alternatively, the networked devices may communicate with one another over a short-range wireless connectivity technology. For example, if the motion monitoring platform 602 resides on the mobile phone 604, data generated by the mobile phone 604—like image data generated by its image sensor—may not need to traverse any networks; however, data could be obtained from the network-accessible server system 614 over the Internet via a Wi-Fi communication channel. As another example, if the motion monitoring platform 602 resides on the tablet computer 608, data may be obtained from the sensor units 610 over a Bluetooth communication channel while data may be obtained from the network-accessible server system 614 over the Internet via a Wi-Fi communication channel.

Embodiments of the communication environment 600 may include a subset of the networked devices. For example, some embodiments of the communication environment 600 include a motion monitoring platform 602 that resides on the mobile phone 604 and monitors pose in real time based solely on analysis of image data generated by the mobile phone 604. As another example, some embodiments of the communication environment 600 include a motion monitoring platform 602 that obtains data from the therapy system

606 (and, more specifically, from the sensor units 610) in real time as physical activities as performed during a session and additional data from the network-accessible server system 614. This additional data may be obtained periodically (e.g., on a daily or weekly basis, or when a session is initiated).

Utilizing Heatmaps Trained with Bipartite Matching Loss to Estimate Pose

Various software-implemented "pipelines" have been developed in an attempt to perform 2D pose estimation based on analysis of a digital image. One example of such a pipeline is described in International Application No. PCT/IB2021/056817 titled "Pose Parsers," which is incorporated by reference herein in its entirety. In this pipeline, two post-processing steps that must be performed outside of any models in order to obtain the desired output. The first post-processing step—called the "joint peak step"—involves identifying the peak in a heatmap created for a digital image of interest. The second post-processing step—called the "bone clustering step"—involves determining how best to fit the identified peaks together in an anatomically appropriate manner. Together, these post-processing steps are computationally intensive, taking about 25 percent of the total inference time. With decoding, it is difficult, if not impossible, to directly supervise the desired target (e.g., a list of J joints for P people), and therefore heatmaps may only be supervised as an intermediate representation.

By employing the approach set forth below, these post-processing steps can be bypassed, with the model itself being designed and trained to directly provide the desired output. Such an approach enables direct supervision during training, and it ensures that extracting important maps out of the responsible processing unit (e.g., from a graphical processing unit to a central processing unit) is not necessary for post-processing purposes. Accordingly, an important aspect of the approach is to utilize bipartite matching loss to directly supervise the generation of joint person heatmaps and combination of those heatmaps with joint type heatmaps to directly obtain a targeted output without post-processing steps needing to be performed outside of the responsible processing unit. The responsible processing unit could be a central processing unit ("CPU") or graphical processing unit ("GPU"), for example. The simplicity and speed of this approach make it attractive for processing units and computing devices with limited computational resources, as well as for ease of cross-platform portability.

A. Related Work

When there are multiple peaks in a joint type heatmap—indicating the presence of multiple people—one would like to classify each peak to the appropriate person. Attempts to solve this problem in the past include:

Bones Heatmaps and Clustering: Results in a set of heatmaps representing connections between joints defined by a skeleton structure. Clustering joints together requires probing bones heatmaps between pairs of joints in order to determine valid connections.

Clustering by Location: Based on a coarser grid (e.g., S×S) than the original image resolution (e.g., H×W), objects are classified into one of the $S^2$ grid cells using the center of an instance to define its location in the grid.

Clustering by Scalar Instance Selector: An additional scalar j is fed to a model as input, to indicate which object must be selected. A single peak in each joint type heatmap is predicted for the selected object. The scalar j=0 is reserved for the largest person in the digital image, while j=1, 2, 3, . . . N−1 are associated with the relative distance to the main person.

B. Approach Based on Clustering by Channel Matching

Figure 7:
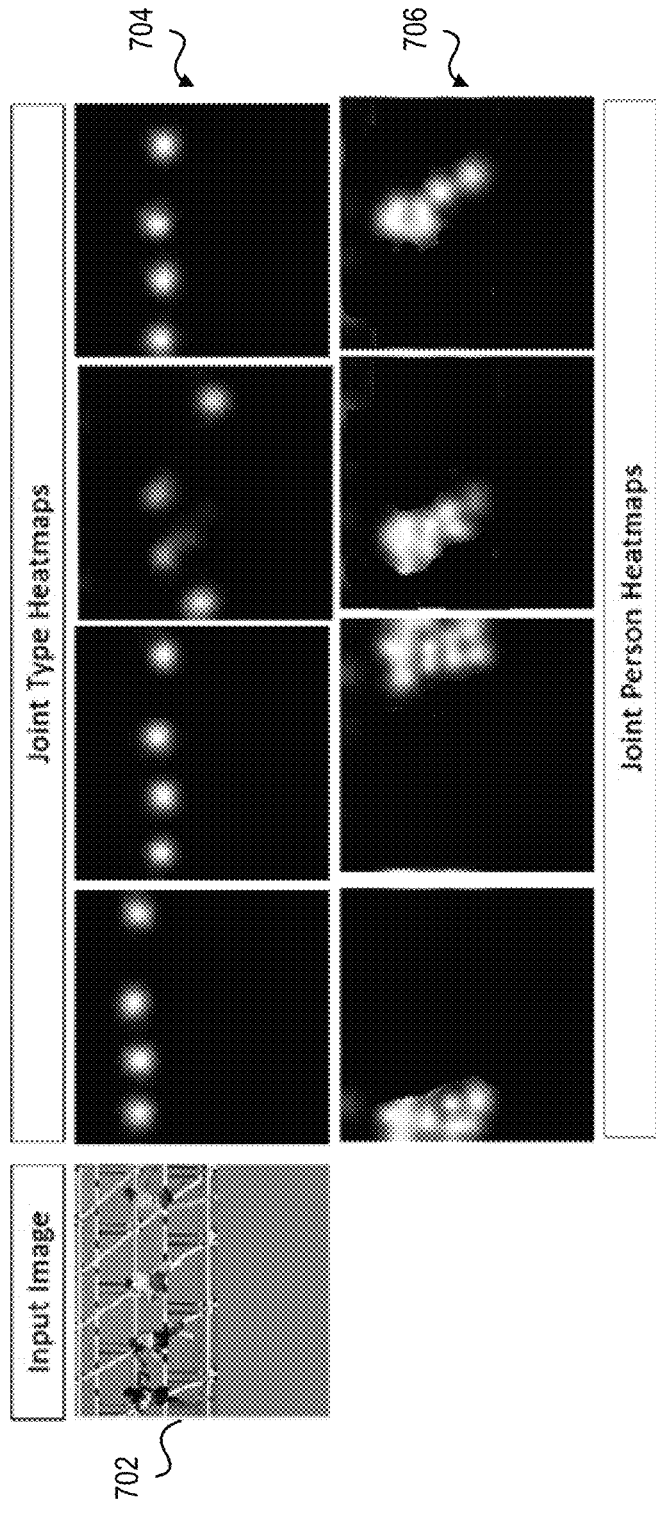
FIG. 7 illustrates how for a resized and padded Red-Green-Blue digital image, a model can output (i) a plurality of joint type heatmaps and (ii) a plurality of joint person heatmaps.

Introduced here is an approach in which the model is allowed to learn its own classification rules through training with a bipartite matching loss. As further discussed below, the model may be designed and trained such that when applied to a digital image, it produces joint person heatmaps in addition to joint type heatmaps. FIG. 7 illustrates how for a resized and padded Red-Green-Blue ("RGB") digital image 702, the model can output (i) a plurality of joint type heatmaps 704 and (ii) a plurality of joint person heatmaps 706. Each of the plurality of joint type heatmaps may correspond to a different joint type, while each of the plurality of joint person heatmaps may correspond to a different person. Accordingly, the number of heatmaps included in each plurality may depend on the number of joints of interest and number of persons included in the digital image 702. Generally, the model is designed and trained to identify at least three joints of interest, though the model could be designed and trained to identify at least four joints of interest, five joints of interest, eight joints of interest, or more. At a high level, each of the joint type heatmaps 704 may indicate pixels that are determined to correspond to instances of the corresponding joint type. Similarly, each of the joint person heatmaps 706 may indicate pixels that are determined to correspond to joints of the corresponding person.

For a given digital image, the order in which the joint person heatmaps that serve as ground truths are created can be set as desired $(H,W,C_{gt})$. The model can be trained to classify each person into a separate channel $(H,W,C_{pred})$ by using the bipartite matching loss between predicted channels and ground truth channels. A loss function can be computed between any possible pairing of predicted and ground truth channels, resulting in a loss matrix $(C_{gt},C_{pred})$. As an example if the loss function is a mean squared error loss function between corresponding pixel values of different heatmaps and then averaged, the matrix will be a squared loss matrix. The motion monitoring platform can apply a matching algorithm (e.g., a bipartite matching algorithm) to the matrix to associate all of the channels into pairings $(i,j)=(C_{gt}[i],C_{pred}[j])$. The training loss function may be updated only with the score of these matched channels (i,j).

Multiple peaks may be present in each joint type heatmap 704, as shown in FIG. 7. Therefore, the motion monitoring platform may rely on a local maxima algorithm (e.g., FindPeaks) that probes each joint type heatmap 704 and outputs no more than a predetermined number of "peaks" that are considered likely locations for that joint type. Local maxima algorithms can be computationally expensive, however, and therefore may be replaced by a simpler algorithm that mixes joint type heatmaps and joint person heatmaps.

Figure 8:
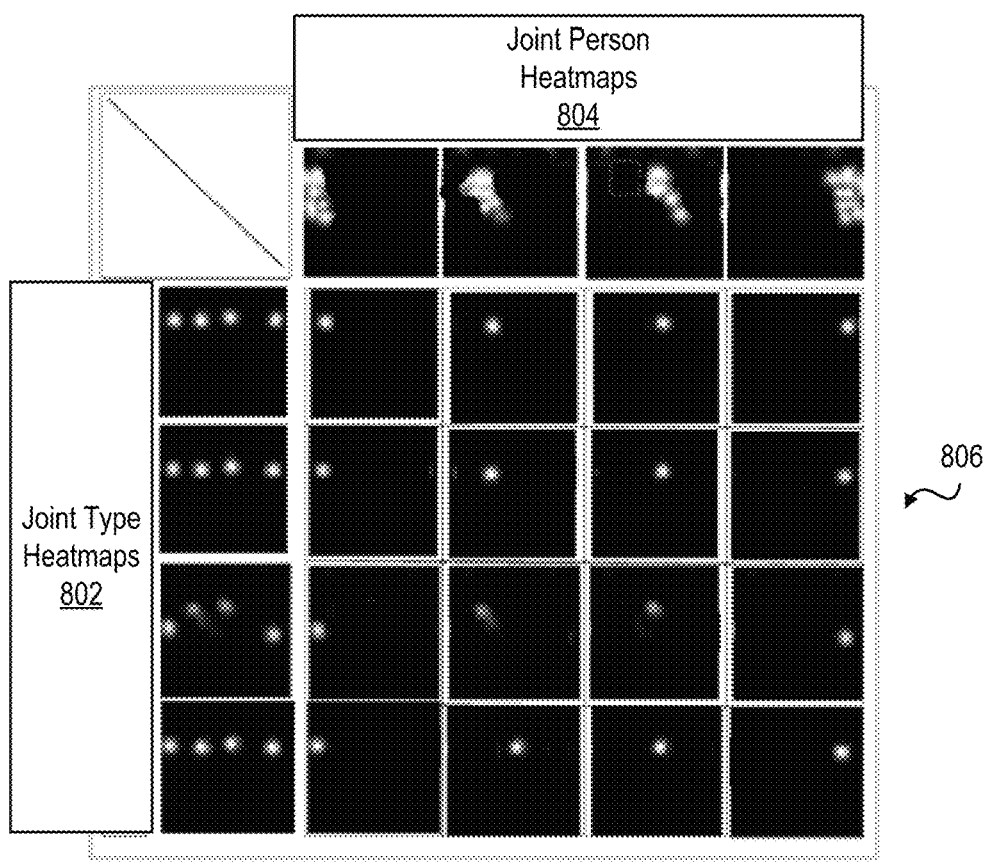
FIG. 8 illustrates how geometrically combining joint type heatmaps with joint person heatmaps can result in a single heatmap for each joint-person combination.

By multiplying the $i^{th}$ joint type heatmap with the $j^{th}$ joint person heatmap, the motion monitoring platform can obtain a heatmap with a single peak. FIG. 8 illustrates how geometrically combining joint type heatmaps 802 with joint person heatmaps 804 can result in a single heatmap for each joint-person combination—a simpler approach to finding and clustering joints. The geometrical construction can combine the joint type heatmaps (H,W,J) 802 with the joint person heatmaps (H,W,P) 804 to obtain single-peak heatmaps (H,W,P,J) 806.

Figure 9:
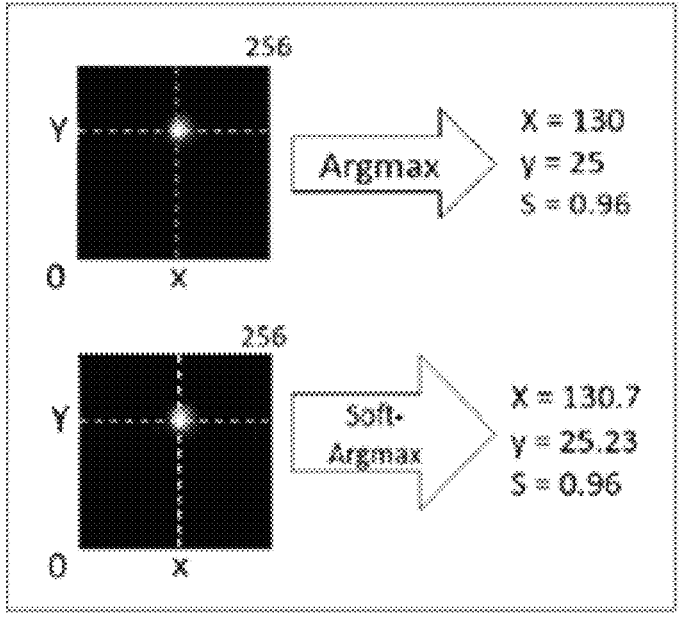
FIG. 9 illustrates how performing an Argmax or SoftArgmax operation directly on a heatmap can provide the two-dimensional location and score of the joint when a single peak is assumed.

In such a situation, the motion monitoring platform may not need to use the local maxima algorithm but could instead use a simpler function, such as Argmax or SoftArgmax, to directly look for the absolute maximum value in each single-peak heatmap. Argmax and SoftArgmax are two examples of functions that are able to find the pixel with the largest value. For each heatmap (H,W), this function will output position x, y and score s at the position Argmax(H, W)=(x,y,s). Then, the motion monitoring platform can obtain the desired output dimension by performing this operation for every heatmap Argmax((H,W,P,J))=(P,J,3). At a high level, this simpler function may attempt to discover the absolute maximum value across the array of values that is representative of the single-peak heatmap—which, as discussed above, can be generated by multiplying the array of values associated with each joint type heatmap 802 with the array of values associated with each joint person heatmap 804. FIG. 9 illustrates how performing an Argmax or SoftArgmax operation directly on a heatmap can provide the 2D location and score of the joint when a single peak is assumed.

In sum, the motion monitoring platform may utilize a pipeline that takes, as input, digital images (e.g., RGB digital images) and directly outputs the 2D locations of J joints individually for P people. The aforementioned approach has several noteworthy features. First, bipartite matching loss can be applied directly to the joint person heatmap representation output by the model. And second, a simple decoding operation can be used to directly provide the desired output without relying on computationally expensive post-processing steps.

C. Methodologies for Training and Utilizing Models for Pose Estimation

FIG. 10A includes a flow diagram of a process 1000 for determining optimal bipartite matching of heatmaps produced by a model for the purpose of establishing the position of joints of individuals. For the purpose of illustration, the model may be described as a neural network; however, those skilled in the art will recognize that other types of models could be used. In embodiments where the model is a neural network, the neural network may be purely convolutional.

Initially, a motion monitoring platform can obtain a digital image that includes a plurality of individuals (step 1001). While the process 1000 could be similarly applied to a digital image that includes a single individual, describing the process 1000 in the context of a digital image that includes multiple individuals allows the benefits of the approach to be more clearly understood. The digital image could be, for example, a standard RGB digital image generated by an image sensor that monitors the multiple individuals as they perform an activity.

The motion monitoring platform can then create, based on the digital image, a first plurality of heatmaps in which variation in color is used to identify pixels that are representative of a corresponding one of a plurality of joints (step 1002). These heatmaps may be called "joint type heatmaps." To accomplish this, the motion monitoring platform may apply a neural network to the digital image, and the first plurality of heatmaps may be produced by the neural network as output. Each heatmap of the first plurality of heatmaps may be representative of an array—for example, a grid in which each square is representative of a pixel—with values that indicate likelihood of being representative of the corresponding joint type. The neural network could be trained to identify any number of joint types. For example, the neural network may be trained to identify instances of the left shoulder, right shoulder, left elbow, right elbow, left wrist, right wrist, left hip, right hip, left knee, right knee, left ankle, right ankle, or any combination thereof. Note that the number and nature of joint types may depend on the intended application of the information—namely, the 2D positions—ultimately surfaced by the motion monitoring platform.

Moreover, the motion monitoring platform can create, based on the digital image, a second plurality of heatmaps in which variation in color is used to identify pixels that are representative of the joints of each of the plurality of individuals (step 1003). These heatmaps may be called "joint person heatmaps." To accomplish this, the motion monitoring platform may apply the same neural network to the digital image, and the second plurality of heatmaps may be produced by the neural network as output. Again, each heatmap of the second plurality of heatmaps may be representative of an array—for example, a grid in which each square is representative of a pixel—with values that indicate likelihood of being representative of the corresponding person. In some embodiments, the neural network may output a plurality of bounding boxes for the plurality of individuals instead of, or in addition to, the second plurality of heatmaps. In such embodiments, each of the plurality of bounding boxes may define an area in which pixels that are representative of a corresponding one of the plurality of individuals lie.

Note that steps 1002-1003 may be performed concurrently in some embodiments. Thus, upon being applied to the digital image, the neural network may produce, as output, the first and second pluralities of heatmaps.

Then, the motion monitoring platform can multiply each of the first plurality of heatmaps with each of the second plurality of heatmaps, so as to produce single-peaked heatmaps (step 1004), as shown in FIG. 8. The motion monitoring platform can then execute a function that specifies, for each of the single-peaked heatmaps, a maximum value that is indicative of the 2D position of a corresponding joint of a corresponding individual (step 1005). Accordingly, by multiplying the first and second pluralities of heatmaps and then identifying the maximum value in each resulting single-peaked heatmap, the motion monitoring platform can identify each of the plurality of joints on each of the plurality of individuals. The motion monitoring platform can store information regarding the 2D positions in a data structure (step 1006). For example, for each of the plurality of individuals, the motion monitoring platform may store the x- and y-coordinates corresponding to the plurality of joints in the data structure. In such embodiments, the data structure may be associated with the digital image provided to the neural network as input and indicate, with x- and y-coordinates, the locations of the various joints of the plurality of individuals that are visible within the digital image.

The 2D positions learned by the motion monitoring platform could be used in various ways. For example, the motion monitoring platform may monitor the 2D positions of the joints of a given individual over time in order to establish whether she is properly performing an activity (e.g., stretching). As another example, the motion monitoring platform may use the 2D positions of the joints of a given individual to manipulate an avatar of the given individual that is viewable through a computer program executing on her computing device. This allows the avatar to mimic movement of the given individual. Accordingly, the motion monitoring platform may use the 2D positions of the joints to manipulate a visualization that is representative of, or meant to convey information to, an individual. The visualization could be an avatar that has a realistic human-like form, or the visualization could be a simpler representation such as a skeletal frame or series of geometric shapes (e.g., lines representing bones or planes defined through the human body that are interconnected by circles representing joints).

Figure 10B:
FIGS. 10B-D include several examples of digital images and corresponding multi-person heatmaps that are produced by combining joint type heatmaps and joint person heatmaps.
Figure 10C:
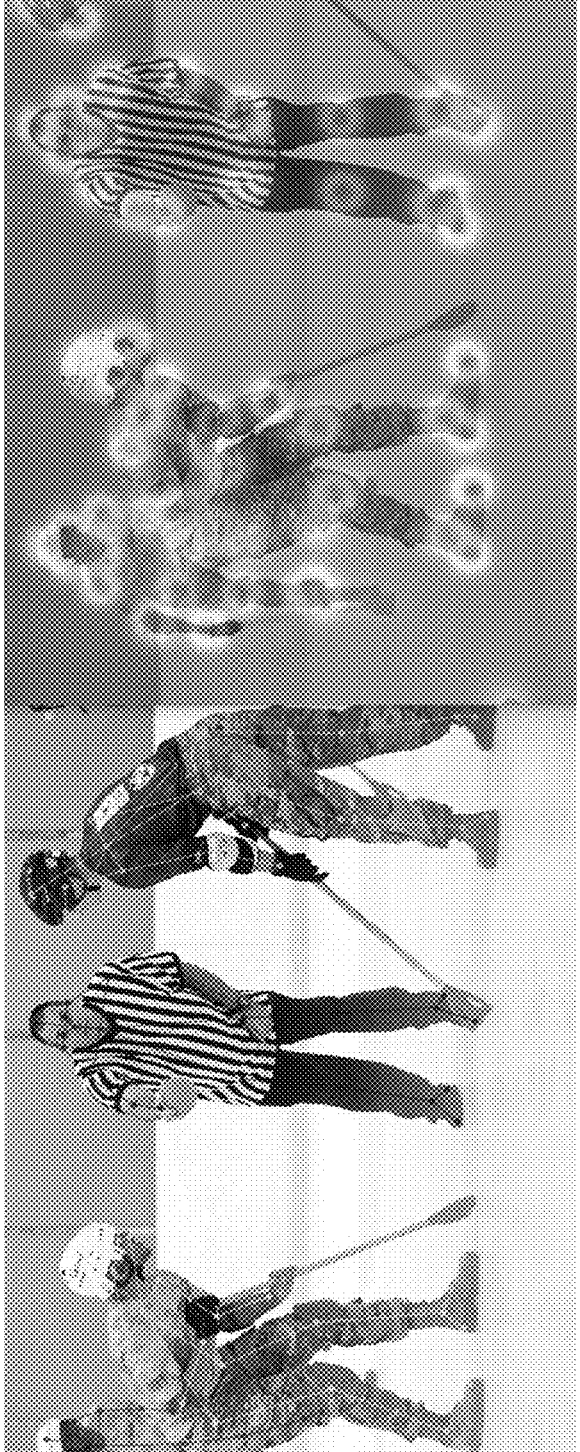
Figure 10D:
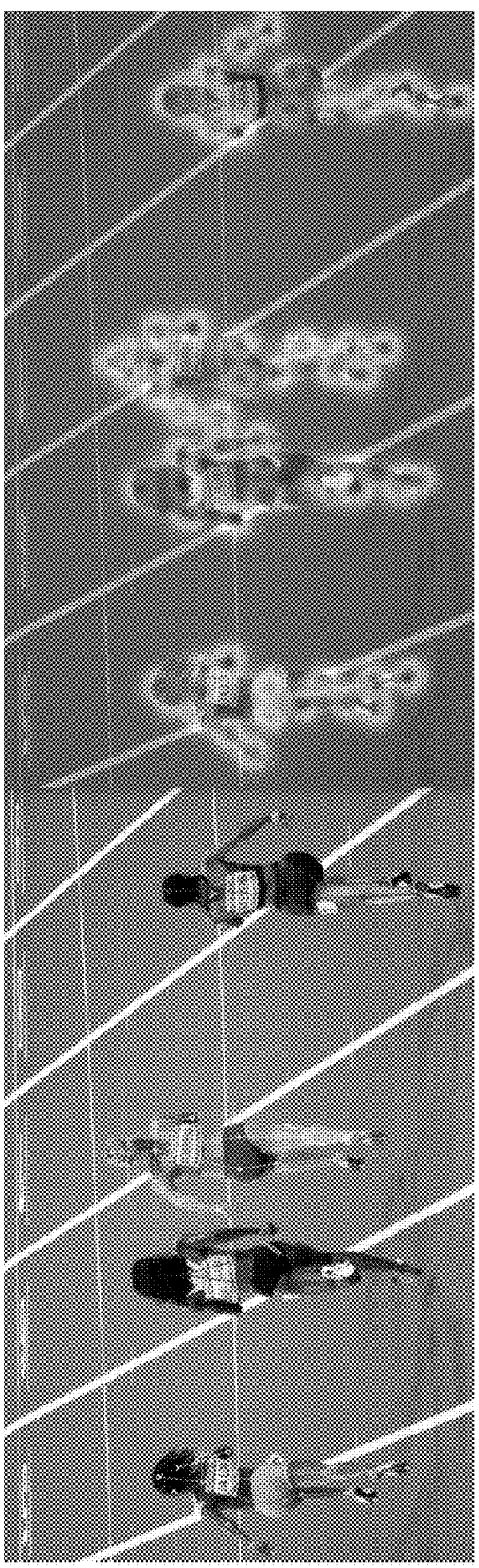
Figure 10E:
FIG. 10E includes an isometric view of a person in a bent pose as well as a rendering of an avatar of that person in the bent pose, as determined through analysis of the joint type heatmaps and joint person heatmap produced by the motion monitoring platform.

FIGS. 10B-D include several examples of digital images and corresponding multi-person heatmaps that are produced by combining joint type heatmaps and joint person heatmaps. With the joint type heatmaps and joint person heatmaps, the motion monitoring platform can reconstruct the skeletal frames (and therefore, establish the positions and poses) of multiple people in a single image. As mentioned above, the 2D positions of the joints could also be used to manipulate a single visualization that is representative of a single one of the multiple people or multiple visualizations that are representative of the multiple people. FIG. 10E includes an isometric view of a person in a bent pose as well as a rendering of an avatar of that person in the bent pose, as determined through analysis of the joint type heatmaps and joint person heatmap produced by the motion monitoring platform. In FIG. 10E, only a single person is shown for the purpose of illustration. A separate visualization could be rendered for each person that is visible in the digital image acquired by the motion monitoring platform, and these visualizations could be presented on the same interface or different interfaces (e.g., each of which may be accessible to a corresponding person).

Note that while the process 1000 is described in the context of a digital image that includes a plurality of individuals, the process may be similarly applicable to scenarios in which the digital image includes a single individual. In such a scenario, the neural network may only produce one joint person heatmap as output, though that joint person heatmap could still be compared against a plurality of joint type heatmaps as discussed above. Accordingly, features, steps, or embodiments described in the context of digital images that include a plurality of individuals may be similarly appliable to digital images that include a single individual unless otherwise specified.

FIG. 11 includes a flow diagram of a process 1100 for determining optimal bipartite matching of heatmaps produced by a model for the purpose of training a neural network to predict the position of joints of individuals. Initially, a motion monitoring platform can obtain a digital image that includes a plurality of individuals (step 1101). The motion monitoring platform can then (i) create, based on the digital image, a first plurality of heatmaps in which variation in color is used to identify pixels that are representative of a corresponding one of a plurality of joints (step 1102) and (ii) create, based on the digital image, a second plurality of heatmaps in which variation in color is used to identify pixels that are representative of the joints of each of the plurality of individuals (step 1103). As mentioned above, the motion monitoring platform may obtain the first and second pluralities of heatmaps by applying a neural network to the digital image. Steps 1101-1103 of FIG. 11 may be similar to steps 1001-1003 of FIG. 10A.

Figure 12:
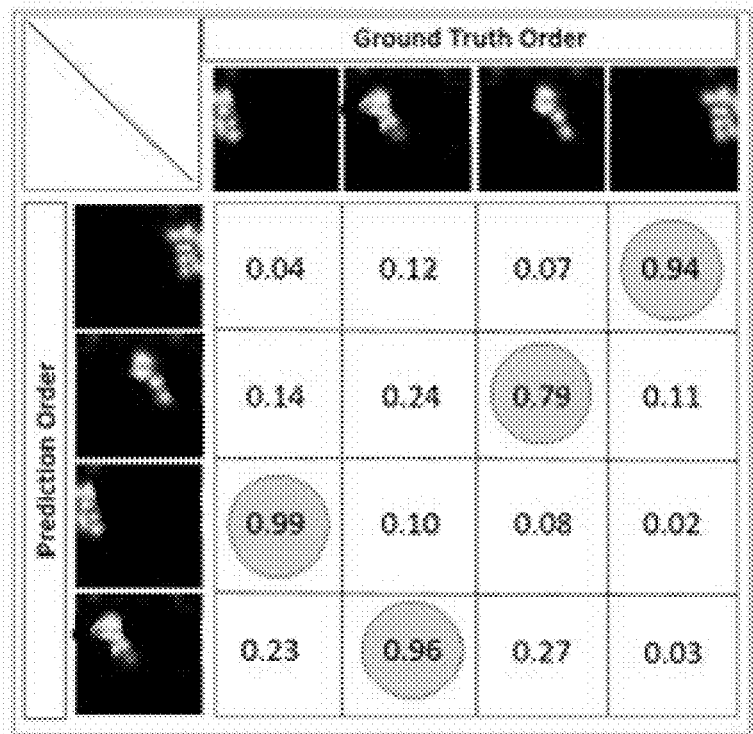
FIG. 12 includes an example of a matrix resulting from a mean squared error calculation between each pairing of heatmaps.

Thereafter, the motion monitoring platform can determine an optimal bipartite matching of the first and second pluralities of the heatmaps, such that each of the first plurality of heatmaps is associated with a matching one of the second plurality of heatmaps (step 1104). For example, the motion monitoring platform may provide the first and second pluralities of heatmaps to an algorithm that produces, as output, a matrix whose values are indicative of error. FIG. 12 includes an example of a matrix resulting from a mean squared error calculation between each pairing of heatmaps; only the pairings with the highest error may be penalized during training as further discussed below. For each of the first plurality of heatmaps, the matrix may include a plurality of values indicative of the error calculated for the second plurality of heatmaps. Based on an analysis of the matrix, the motion monitoring platform can identify each pairing with the lowest error value (and each pairing with the highest error value, as further discussed below) and define the optimal bipartite matching accordingly. In some embodiments, the motion monitoring platform stores an indication of the optimal bipartite matching in a data structure that is associated with the digital image (step 1105).

Further, the motion monitoring platform may update a loss function that is used to train the neural network based on the matrix (step 1106). For example, for each of the first plurality of heatmaps, the motion monitoring platform may identify which of the second plurality of heatmaps has the highest error value. The identified heatmaps may be penalized during training, so as to account for the high error values.

Note that, in some embodiments, the steps of these processes may be performed repeatedly in rapid succession. Assume, for example, that the digital image is part of a series of digital images arranged in temporal order that are representative of frames of a video. In such embodiments, the process 1000 of FIG. 10A could be performed for each frame of the video—or for a subset of the frames, such as every other frame, every third frame, etc.—so that pose of an individual can be estimated over time. As pose is continually estimated, a visualization of the individual could be updated by the motion monitoring platform to visually illustrate changes in pose. Said another way, the visualization of the individual could be updated continually over the length of the video to reflect changes in pose.

Additional steps could also be performed. As mentioned above, at least one of the first plurality of heatmaps may include multiple peaks, each of which is representative of a possible location of the corresponding joint type. By multiplying each of the first plurality of heatmaps with each of the second plurality of heatmaps, the motion monitoring platform can obtain single-peaked heatmaps as shown in FIG. 8. Each single-peaked heatmap is representative of a combination of joint type and person, and as such, the single-peaked heatmaps allow the location of different joints on any of the plurality of individuals to be readily established.

In some embodiments, the motion monitoring platform may only be interested in monitoring the motion of a single individual, even though multiple individuals may be included in the digital image. In such embodiments, the motion monitoring platform may still obtain a first plurality of heatmaps corresponding to a plurality of joint types. However, the motion monitoring platform may apply a local maxima algorithm to the first plurality of heatmaps, so as to identify, for each of the first plurality of heatmaps, no more than a predetermined number of peaks to be included for consideration. To identify the peaks, the local maxima algorithm may consider the number of pixels, pixel intensity, pixel coverage (e.g., in terms of width, height, or total area), or some combination thereof. For each peak in excess of the predetermined number, the motion monitoring platform can eliminate that peak by adjusting an intensity value of the corresponding pixels. For example, the motion monitoring platform may adjust the intensity value of the corresponding pixels to zero, such that the corresponding pixels are the same color as pixels that were determined, by the neural network, to not be representative of the corresponding one of the plurality of joints. Thus, the motion monitoring platform may filter peaks that appear to be false positives or appear to be associated with another individual who is not presently of interest. The predetermined number could be any integer value, though the motion monitoring platform may set the predetermined number to one so that only the most likely candidate for each joint type is considered.

Figure 13:
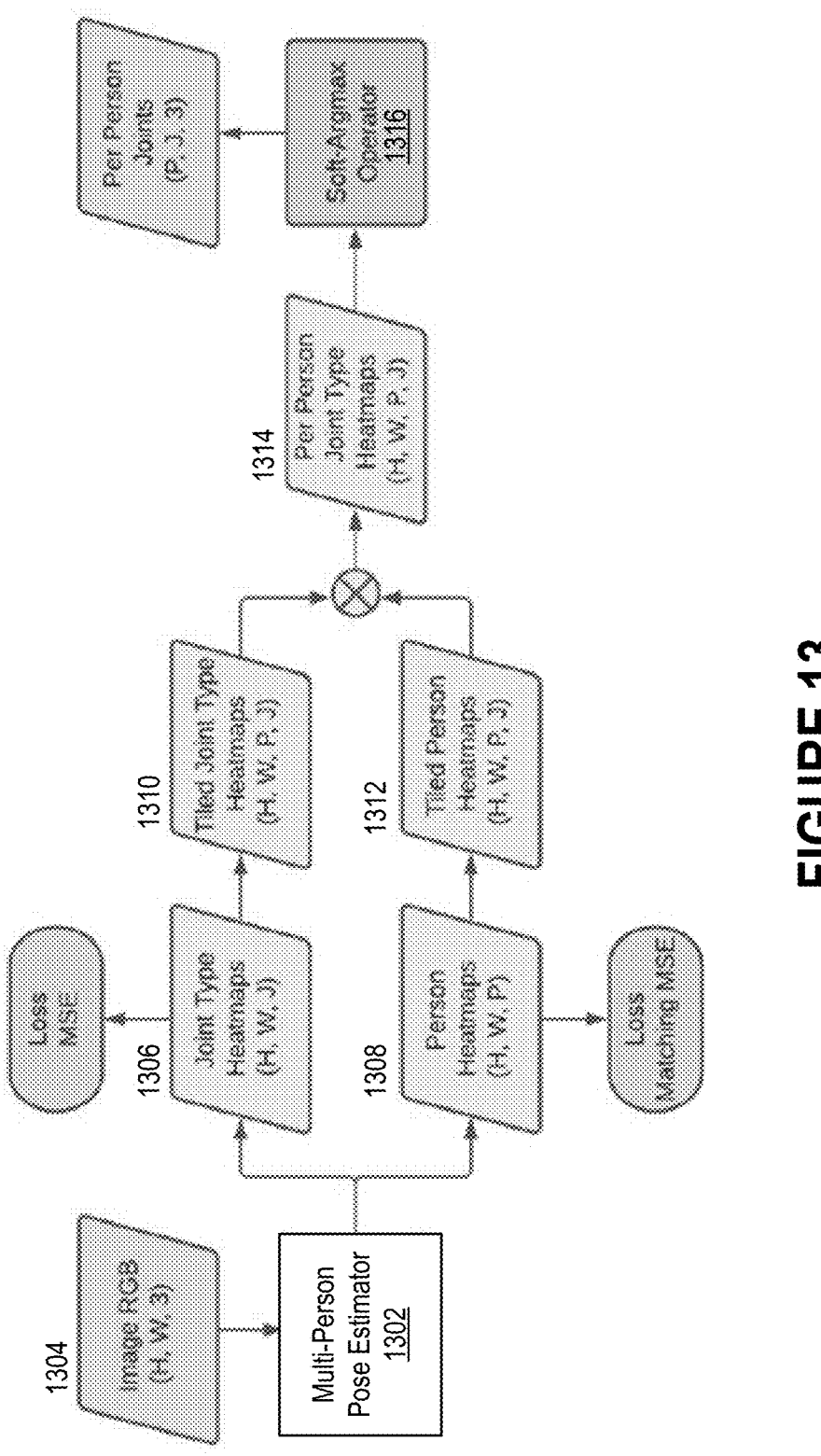
FIG. 13 illustrates an example architecture of a multi-person pose estimator that uses bipartite matching loss supervision.

The processes 1000, 1100 of FIGS. 10-11 can be implemented by the example architecture shown in FIG. 13. FIG. 13 illustrates an example architecture 1300 of a multi-person 2D pose estimator 1302 that uses bipartite matching loss supervision. Note that this example architecture could be implemented by, or accessible to, a motion monitoring platform. As shown in FIG. 13, the example architecture includes a multi-person pose estimator 1302 that takes, as input, a digital image 1304 (e.g., having dimensions of H×W across three color channels) and produces, as output, joint type heatmaps 1306 and joint person heatmaps 1308. In some embodiments, the joint type heatmaps 1306 and joint person heatmaps 1308 are converted into tiled joint type heatmaps 1310 and tiled joint person heatmaps 1312, respectively, through the use of a tile overlay. Each tiled joint type heatmap 1310 can include an array of tiles, each of which is representative of the content of the pixels within that tile as determined from the corresponding joint type heatmap 1306. Similarly, each tiled joint person heatmap 1312 can include an array of tiles, each of which is representative of the content of the pixels within that tile as determined from the corresponding joint person heatmap 1308. These tiles may be logistically simpler and less computationally burdensome to multiply than the actual per-pixel values in the joint type heatmaps 1306 and joint person heatmaps 1308. Note that the number of tiles may depend on the desired resolution of the single-peak heatmaps 1314 produced by multiplying the tiled joint type heatmaps 1306 and tiled joint person heatmaps 1308. For example, each tile may have dimensions of 10×10 pixels, 20×20 pixels, 50×50 pixels, etc. Thereafter, a function 1316—such as Argmax or SoftArgmax—can be applied directly to each single-peak heatmap 1314 to provide the 2D location of each joint that is visible within the digital image for a given person.

Processing System

Figure 14:
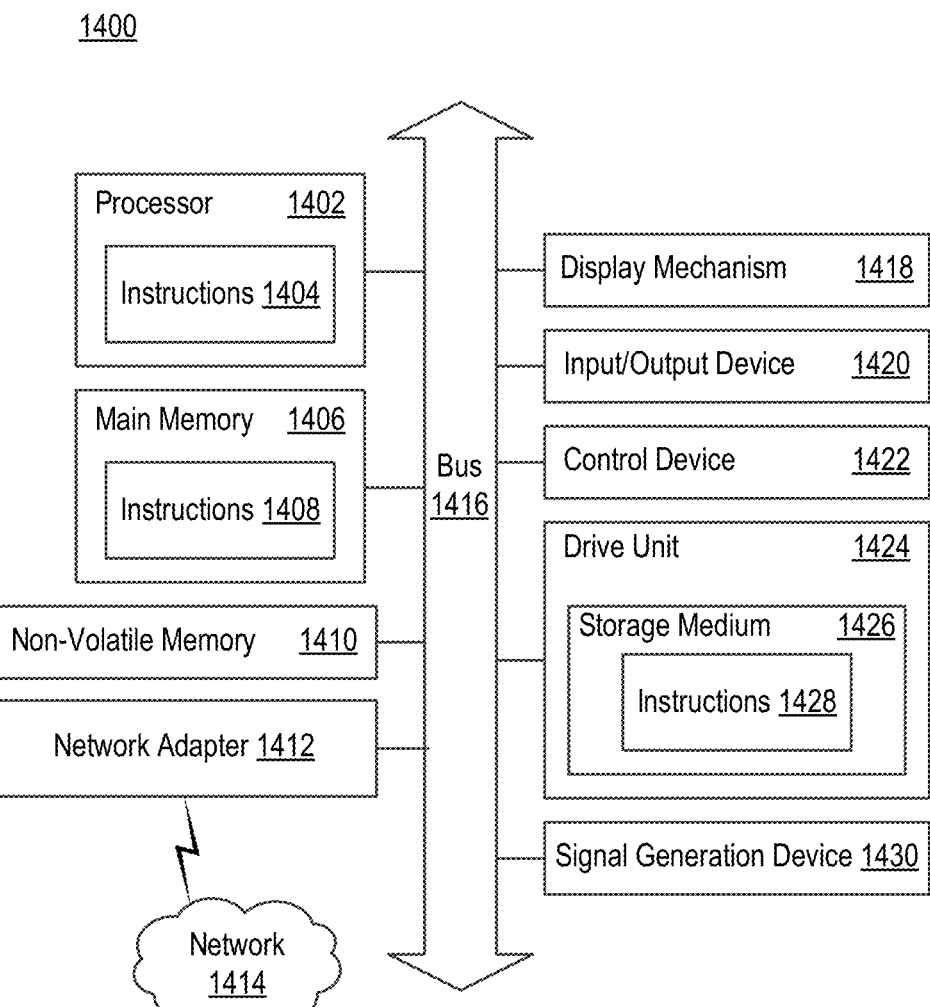
FIG. 14 includes a block diagram illustrating an example of a processing system in which at least some operations described herein can be implemented.

FIG. 14 includes a block diagram illustrating an example of a processing system 1400 in which at least some operations described herein can be implemented. For example, components of the processing system 1400 may be hosted on a computing device that includes a motion monitoring platform (e.g., motion monitoring platform 302 of FIG. 3, motion monitoring platform 412 of FIG. 4, motion monitoring platform 502 of FIG. 5, or motion monitoring platform 602 of FIG. 6).

The processing system 1400 can include a processor 1402, main memory 1406, non-volatile memory 1410, network adapter 1412, video display 1418, input/output devices 1420, control device 1422 (e.g., a keyboard or pointing device such as a computer mouse or trackpad), drive unit 1424 including a storage medium 1426, and signal generation device 1430 that are communicatively connected to a bus 1416. The bus 1416 is illustrated as an abstraction that represents one or more physical buses or point-to-point connections that are connected by appropriate bridges, adapters, or controllers. The bus 1416, therefore, can include a system bus, a Peripheral Component Interconnect ("PCI") bus or PCI-Express bus, a HyperTransport ("HT") bus, an Industry Standard Architecture ("ISA") bus, a Small Computer System Interface ("SCSI") bus, a Universal Serial Bus ("USB") data interface, an Inter-Integrated Circuit ("I²C")

bus, or a high-performance serial bus developed in accordance with Institute of Electrical and Electronics Engineers ("IEEE") 1394.

While the main memory 1406, non-volatile memory 1410, and storage medium 1426 are shown to be a single medium, the terms "machine-readable medium" and "storage medium" should be taken to include a single medium or multiple media (e.g., a centralized/distributed database and/or associated caches and servers) that store one or more sets of instructions 1428. The terms "machine-readable medium" and "storage medium" shall also be taken to include any medium that is capable of storing, encoding, or carrying a set of instructions for execution by the processing system 1400.

In general, the routines executed to implement the embodiments of the disclosure can be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in a computing device. When read and executed by the processors 1402, the instruction(s) cause the processing system 1400 to perform operations to execute elements involving the various aspects of the present disclosure.

Further examples of machine- and computer-readable media include recordable-type media, such as volatile memory devices and non-volatile memory devices 1410, removable disks, hard disk drives, and optical disks (e.g., Compact Disk Read-Only Memory ("CD-ROMs") and Digital Versatile Disks ("DVDs")), and transmission-type media, such as digital and analog communication links.

The network adapter 1412 enables the processing system 1400 to mediate data in a network 1414 with an entity that is external to the processing system 1400 through any communication protocol supported by the processing system 1400 and the external entity. The network adapter 1412 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments can vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computing device comprising:
a display mechanism;
an image sensor that is configured to generate a digital image of an ambient scene that includes a plurality of individuals;
a memory that includes instructions for estimating poses of the plurality of individuals; and
a processing unit that, upon executing the instructions, is configured to:
apply, to the digital image, a machine learning model that produces as output
(i) a first plurality of heatmaps, each of which uses color to identify pixels that are representative of a corresponding one of a plurality of joints, and
(ii) a second plurality of heatmaps, each of which uses color to identify pixels that are representative of joints of a corresponding one of the plurality of individuals;
determining an optimal bipartite matching of the first and second pluralities of heatmaps by providing the first and second pluralities of heatmaps to an algorithm that produces, as output, a matrix that includes, for each of the first plurality of heatmaps, a plurality of values, each of which is indicative of error calculated between that heatmap and a corresponding one of the second plurality of heatmaps;
establishing, based on the matrix, a matching scheme between the first and second pluralities; and
generating, based on the matching scheme, a visualization that includes a representation of at least one of the plurality of individuals.

2. The computing device of claim 1, wherein the processing unit is a central processing unit.

3. The computing device of claim 1, wherein the processing unit is a graphical processing unit.

4. The computing device of claim 1, wherein the machine learning model is a purely convolutional neural network.

5. The computing device of claim 1, wherein the representation is an avatar that has a human-like form.

6. The computing device of claim 1, wherein the machine learning model is designed to identify at least four joints of interest.

7. A method for estimating pose of one or more persons in a digital image based on an analysis of locations of one or more joints, the method comprising:
applying a neural network to the digital image so as to produce (i) for each of the one or more persons, a person heatmap in which color is used to identify pixels that are representative of visible joints, and (ii) for each of the one or more joints, a joint heatmap in which color is used to identify pixels that are representative of that joint;

determining an optimal bipartite matching between the one or more person heatmaps and the one or more joint heatmaps by minimizing a mean squared error calculation between each pair of heatmaps formed by selecting one of the one or more person heatmaps and one of the one or more joint heatmaps; and generating, based on the optimal bipartite matching, a visualization that includes a representation of at least one of the one or more persons.

8. The method of claim 7, further comprising:

storing an indication of the optimal bipartite matching in a data structure that is associated with the digital image.

9. The method of claim 7, wherein the digital image is included in a series of digital images arranged in temporal order that are representative of frames of a video, and wherein said applying, said determining, and said generating are performed for each digital image included in the series of digital images, such that the visualization is updated over a length of the video.

10. The method of claim 9, further comprising:

causing display of the visualization, as updated over the length of the video, to the at least one person so as to visually illustrate changes in pose over time.

11. The method of claim 7, further comprising:

receiving the digital image that is captured by an image sensor included in a computing device that is accessible to the at least one person.

12. The method of claim 11, further comprising:

transmitting the visualization to the computing device for display to the at least one person.

13. A non-transitory medium with instructions stored thereon that, when executed by a processor of a computing device, cause the computing device to perform operations comprising:

receiving input indicative of a request, from a person, to initiate a session in which a physical activity is to be performed;

obtaining a series of frames that are collectively representative of a video of the physical activity being performed by the person; and for each frame in the series of frames, applying, to that frame, a machine learning model that produces as output (i) a heatmap in which color is used to identify pixels that are representative of visible joints of the person, and (ii) a plurality of heatmaps in which color is used to identify pixels that are representative of a corresponding one of a plurality of joints;

determining an optimal matching of the heatmap against the plurality of heatmaps by computing error between the heatmap and each of the plurality of heatmaps and then establishing a matching scheme based on the computed errors, so as to establish a two-dimensional (2D) position for each joint of the plurality of joints for the person;

generating, based on the optimal matching, a visualization that includes a representation of the person; and causing display of the visualization so as to illustrate pose in that frame.

14. The non-transitory medium of claim 13, wherein the person is one of a plurality of people included in the series of frames, wherein the heatmap is included in a second plurality of heatmaps in which color is used to identify pixels that are representative of visible joints of a corresponding one of the plurality of people, and wherein said determining comprises:

providing the plurality of heatmaps and the second plurality of heatmaps to a matching algorithm that defines pairings between the plurality of persons and the plurality of joints.

15. The non-transitory medium of claim 13, wherein the plurality of joints includes at least four of left shoulder, right shoulder, left elbow, right elbow, left wrist, right wrist, left hip, right hip, left knee, right knee, left ankle, or right ankle.

* * * * *